United States Patent Office 3,110,679
Patented Nov. 12, 1963

3,110,679
NEUTRAL COMPOSITION FOR REMOVAL OF RUST
Martin Rubin, 8522 Milford Ave., Silver Spring, Md.
No Drawing. Filed Mar. 17, 1959, Ser. No. 799,858
5 Claims. (Cl. 252—152)

This invention relates to a rust removing composition.

Despite the efforts of many workers in the art, the problem of the removal of rust from iron surfaces is one which even yet resists solution. The major difficulty stems from the fact that the agents known to the prior art which are able to cause the sloughing off of rust deposits or the dissolving of rust are in themselves so corrosive that they tend to damage the surface being cleaned. Thus the mineral acid solutions commonly used must be compounded with inhibitor materials so that they themselves will not severely corrode relatively delicate units like automobile radiators. Likewise strongly alkaline compositions cause difficult corrosion problems when used in the presence of alkali reactive surfaces like aluminum housings.

The prime object of the present invention is to provide a substantially neutral non-corrosive composition which has a marked ability to dissolve rust, to simultaneously sequester iron oxide particles, and also to provide a detergent action which accelerates removal of rust from any surface to which it is attached.

Further objects and the advantages of the instant invention will be apparent from the description which follows.

The ingredients of the instant composition are first as the major portion specially prepared concentrate from the *Agave sisalana* or *Agave fourcroydes* plants and second as the minor portion a specific synthetic amino acid compound. These ingredients when properly compounded provide a neutral composition of unusual and unexpected potency for the removal of rust.

The concentrate of sisal juice is prepared by evaporative concentration of the freshly obtained juice available in large quantity from the ordinary process of decortication of sisal leaves. It is essential for the purposes of this invention that the fresh sisal juice be inhibited against fermentation. This may be done by heating to temperatures of above 75° C. for periods longer than three minutes immediately after its collection in the decortication operation. This heat treatment serves to inhibit fermentation of the juice by intracellular enzymes released by the decortication. Fermentation, if not prevented, rapidly destroys the utility of the juice for the purposes of this invention. Alternatively, inhibition of fermentation may be effected by raising the pH of the fresh juice, which is normally about pH 4-5, to a level greater than pH 10. This alkalinization may be effected, for example, by adding commercial caustic solution to the raw juice as it is obtained from the decortication process. The heat treated or alkaline treated fermentation-inhibited sisal juice may then be stored for appreciable periods prior to evaporative concentration to desired solids content.

Suitably, concentration can be effected by evaporative cooking under a direct fired oil heated unit, by heating with superheated steam or by spray drying to an amorphous solid residue. When concentrated by oil fired evaporative heating, the product is conveniently obtained as a viscous liquid of approximately 25-40% solids content. When spray dried the amorphous solid should be dried to an essentially moisture-free condition.

For practice of the instant invention the fermentation-inhibited sisal juice may be employed at its natural solids concentration, as a concentrated solution, or even as a dried powder.

The amino acid effective for purposes of this invention is N,N-di-(o-hydroxybenzyl)-ethylene diaminediacetic acid, a compound of the following chemical formula:

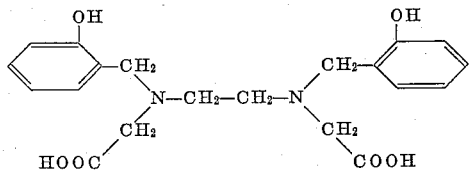

This compound is commercially available in the form of the acid, the sodium salt or dissolved in a caustic solution.

For best effect, the amino acid should be used as a relatively minor constituent of the mixture; specifically it should be present in a ratio of about ½ to 20 parts per 100 parts of sisal juice solids. In part the actual ratio employed can be related to the conditions of ultimate employment, higher proportions of amino acid being best adapted for instances where quick removal of relatively large quantities of rust is desired. For most instances, e.g., radiator cleaning, a low ratio is suitable and, for reasons of economy, is generally to be preferred. Similarly, the ultimate concentration of two ingredients in the aqueous treating medium is largely a matter of choice and, therefore, dependent upon the specific use. Surprisingly, dilute concentration can be efficacious for many purposes like keeping water-cooling towers free of rust, but prepared solutions containing less than about 2½ % sisal solids become exorbitantly expensive to ship. Dilution to a lower solids level, when desired, should best be left to the ultimate consumer. In any event a generally neutral treating solution (pH 5.5-8.5) should be employed. If alkaline inhibited sisal juice forms part of the rust removing composition an appropriate pH adjustment may on occasion have to be made when compounding the treating solution.

For further understanding of the practice of the instant invention the following specific examples are given:

Example I

To 500 lbs. of a thermally stabilized sisal juice concentrated to 30% solids content is added a solution of 1.5 lbs. of the amino acid in the form of its sodium salt. The mixture is well stirred with gradual addition of 5% caustic solution until the pH has risen from its original level of 4 to 5 to a level of between 6.5-7.5. The solution is now diluted with water to a total of 1,000 lbs. It is filtered clear of the small quantity of insoluble residue and is then ready for use.

In application this neutral solution is added to the water cooling system of an automobile at the radiator inlet. After the motor is operated for 30 minutes the solution is drained from the system in the usual way (and can be directly replaced by the water coolant). The action of the rust removing composition may be readily gauged by the coloration of the used solution, namely its deep purple hue, characteristic of a solution of iron.

Example II

To 150 parts of spray dried alkali-stabilized sisal residue is added 15 lbs. of the amino acid. The mixture is milled to a fine powder. In use, this powder may be added, as such, to an aqueous solution or suspension already in contact with the surface being treated to remove rust.

While no certain information is available as to the exact scientific grounds on which to base the unusual efficacy of the instant composition, it is believed that certain activities of the two components complement each other to provide the notably useful results of the composition as a whole. The sisal component of the composition has an unusual surface active potency as well as a sequestrant activity for lime and iron salts. These properties permit easy penetration into rust, and separation of adherent particles from surfaces. The amino acid of the present composition provides for rapid solution of iron oxide particles. The combination of the high buffer capacity of the sisal concentrate with the additional activities enumerated above join with the more rapid potency of the amino acid for dissolving iron oxide to provide the high efficiency and capacity for removal of surface rust.

What is claimed is:

1. A rust removing composition consisting essentially of an aqueous solution of fermentation-inhibited sisal juice solids and N,N'-di-(o-hydroxy benzyl)-ethylene diamine diacetic acid in a ratio of ½–20 parts of the amino acid per 100 parts of sisal juice solids.

2. A rust removing composition consisting essentially of a mixture of fermentation-inhibited sisal juice solids and N,N'-di-(o-hydroxy benzyl)-ethylene diamine diacetic acid in a ratio of ½–20 parts of the amino acid per 100 parts of sisal juice solids.

3. A rust removing composition consisting essentially of a neutral aqueous solution of fermentation inhibited sisal juice solids and N,N'-di-(o-hydroxy benzyl)-ethylene diamine diacetic acid in a ratio of ½–20 parts of the amino acid per 104 parts of sisal juice solids.

4. The composition of claim 3 wherein the sisal juice solids are incorporated therein in the form of sisal juice concentrated to about a 30% solids content.

5. A rust removing composition consisting essentially of a neutral aqueous solution of at least 2½% by weight thereof of fermentation-inhibited sisal juice solids and N,N'-di-(o-hydroxy benzyl)-ethylene diamine diacetic acid in a ratio of ½–20 parts of the amino acid per 100 parts of sisal juice solids.

References Cited in the file of this patent

UNITED STATES PATENTS

| Re. 23,767 | Bersworth | Jan. 12, 1954 |
| 2,012,641 | Smead | Aug. 27, 1935 |
| 2,260,470 | May | Oct. 28, 1941 |
| 2,624,757 | Bersworth | Jan. 6, 1953 |

OTHER REFERENCES

Zussman: Metal Complexing Agents in Soap and Detergent Products, pages 79, 81, 83 and 139 in Soap and Sanitary, Chemicals, November 1952.

Sequestrene, Alrose Chemical Co., recd. Feb. 21, 1953, page 3.